United States Patent [19]

Samuels et al.

[11] Patent Number: 4,956,873
[45] Date of Patent: Sep. 11, 1990

[54] IMAGE PROCESSING APPARATUS

[75] Inventors: Mark A. Samuels, Hockley; Stephen Dimmick, Rayleigh, both of United Kingdom

[73] Assignee: GEC-Marconi Limited, Stanmore, United Kingdom

[21] Appl. No.: 202,634

[22] Filed: Jun. 6, 1988

[30] Foreign Application Priority Data

Jun. 5, 1987 [GB] United Kingdom ................ 8713194

[51] Int. Cl.$^5$ .............................................. G06K 9/40
[52] U.S. Cl. ...................................... 382/54; 358/447
[58] Field of Search ............................ 382/50, 52, 54; 358/430, 447, 451, 497, 463

[56] References Cited

U.S. PATENT DOCUMENTS

| 4,128,830 | 12/1978 | Weythman | 358/463 |
| 4,129,853 | 12/1978 | Althauser et al. | 358/463 |
| 4,162,481 | 7/1979 | DuVall | 382/52 |
| 4,288,817 | 9/1981 | Igel | 358/163 |
| 4,298,887 | 11/1981 | Rode | 358/113 |
| 4,562,486 | 12/1985 | Suzuki et al. | 382/50 |
| 4,736,439 | 4/1988 | May | 382/54 |
| 4,827,533 | 5/1989 | Tanaka | 382/54 |

FOREIGN PATENT DOCUMENTS

| 1588018 | 6/1977 | United Kingdom . |
| 4288817 | 9/1981 | United Kingdom . |

OTHER PUBLICATIONS

"IEEE Transactions on Pattern Analysis and Machine Intelligence" vol. PAM1-4 (1982) Jan., No. 1, NY, U.S.A.; pp. 57-61.

Primary Examiner—Leo H. Boudreau
Assistant Examiner—Michael R. Cammarata
Attorney, Agent, or Firm—Spencer & Frank

[57] ABSTRACT

In order to correct the swathe related banding effect often seen on swathe-scanned imagers a vertical smoothing function separates out artifact detail from the idealized image and derives, from this, proportional corrections for each channel within a swathe. In cases where the artifact varies from swathe to swathe a second algorithm is used to obtain correction values for each line of the image.

11 Claims, 4 Drawing Sheets

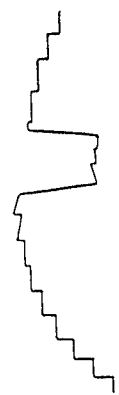
FIG. 4a
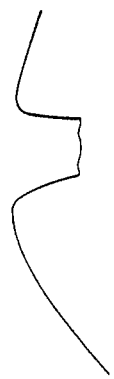
FIG. 4.b
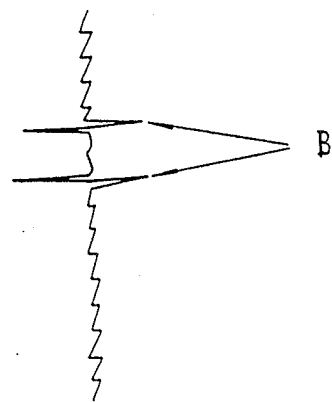
FIG. 4.c

IMAGE PROCESSING APPARATUS

BACKGROUND OF THE INVENTION

This invention relates to an image processing apparatus, and in particular it relates to apparatus of the type which includes a number of channels of detectors and scans an image in swathes, each swathe comprising a simultaneous scan of all of the channels. Such systems are commonly used in infra-red and other radiation imaging systems.

However, since there are inevitably variations in detector element responsivities and offsets, a degree of signal processing is generally required to match the detector signals. Such a signal processing technique usually makes one or more assumptions, the most common of which is that the portions of the image viewed by each detector element during one entire field or frame scan are essentially the same, i.e., the average image intensity viewed by the first detector element over the entire frame or field is equal to the average intensity viewed by the n'th detector. For the majority of images this assumption is reasonable and good matching between channels is achieved.

However, for certain images these assumptions are not valid, particularly where there is a temperature gradient across a scene such as a transition between sky and ground. This results in a swathe related banding structure becoming evident in the displayed image in which bands are seen on the image of width equal to the swathe width and the swathe boundaries are highly noticeable. The degree of degradation of the image will of course depend upon the actual scene being imaged.

It is convenient to think of these degraded images the sum of the ideal image and a so called "artifact" image which varies in the vertical image direction but substantially constant in the horizontal direction, the artifact image being that portion of the image which differs from the idealised image. Although the artifact image may show substantial differences from line to line within a swathe, due to differences in the gains and offsets of individual detectors, the artifact image of an individual channel often only varies slowly in the vertical image direction. This results in the artifact portion of the image comprising a slowly varying structure that is repeated for each swathe in the image. Thus a banded structure is seen.

The present invention arose from a need to provide a method for removing the artifact and producing a clearer and better quality final image.

SUMMARY OF THE INVENTION

According to the present invention there is provided apparatus for processing an image, which image is of the type comprising a plurality of lines which together form a representation of the image, comprising: means for deriving a first set of values, each value being representative of a chosen (i.e. predetermined) parameter of each image line; means for deriving, from the first set of values, a second set of values, each respective second value being substantially representative of the artifact image for each respective line; means for deriving from the second set of values a set of correction values for applying to the image; and means for applying the correction values to the image.

Preferably, the chosen parameter is the average intensity of each respective line.

By adjusting the outputs in this way, a type of smoothing, which will be referred to as vertical smoothing, is applied to the image and the degrading "banding" artifact, seen when the image is a swathe scanned one, is noticeably reduced.

In one embodiment of the invention the means for deriving the average intensity of each respective line comprises an accumulator to which the intensity values of each pixel within the line are applied.

In a preferred embodiment each respective one of the second set of values is the difference between each respective one of the first set of values and a local average value of the chosen parameter over a chosen umber of adjacent lines.

The apparatus may be adapted for use with an image whose artifact has a substantially regular repeated structure and includes means for calculating the local average over a number of values equal to the repetition period of the regular structure. The image can for example, be swathe scanned in which case one correction is derived for each channel within the swathe. This correction may be equal to the mean or median of the second set of values for that channel, over the entire image.

In order to overcome the problem of additional artifacts being introduced by derived error values arising from objects of noticeably different intensity within the image, the apparatus may further include a filtering function adapted to act on a chosen number of adjacent error values for each channel in turn and to obtain a median value for those error values which is used to obtain the average error value for that channel over the entire image.

The filtering function may be a 3 point median filter adapted to pass over each channel in turn.

The correction function may be applied to the channel outputs through a feed forward or a feed back arrangement.

BRIEF DESCRIPTION OF THE DRAWINGS

FIGS. 4a to 4c show the affects of smoothing and error calculation on an image with a noteable object.

DESCRIPTION OF PREFERRED EMBODIMENTS OF THE INVENTION

Figure 1:
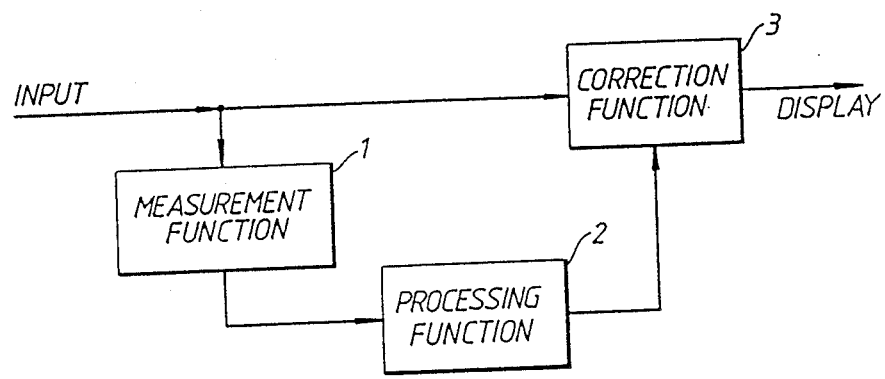
FIG. 1 is a block circuit diagram which shows an application of the present invention in a feed forward mode.

FIG. 1 shows only those parts of an imaging system which are relevant to the present invention. A typical imager comprises a number q of channels of detectors, which are scanned simultaneously in swathes across a scene in the normal manner. As described above, without further correction processing the normal processing of such signals may give a banded swathe related structure. Such an image, after normal processing and hence already containing the artifact detail, and therefore exhibiting banding, is applied as the input to the apparatus shown in FIG. 1, which therefore does not actually cure the cause of the artifact but rather applies post processing to subsequently remove the regular banding before display of the resulting image.

The system comprises three processing units, which perform, respectively, a measurement function 1, a processing function 2 and a correction function 3. After correction, the video signals are output for display or further processing as may be required.

Figure 2:
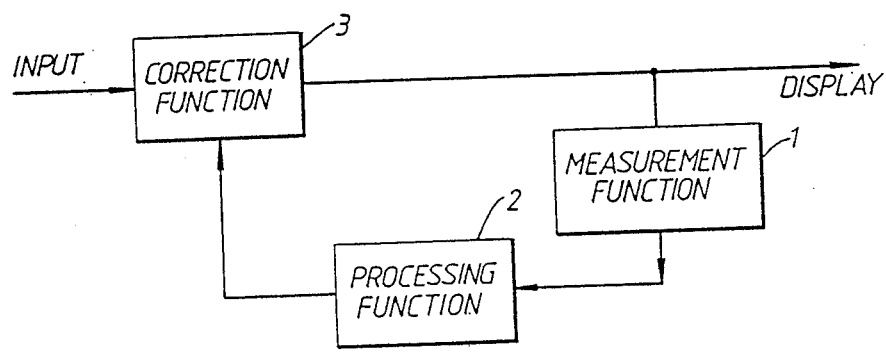
FIG. 2 is a block circuit diagram which shows an application of the present invention in a feed back mode.

FIG. 2 shows an alternative arrangement in which the three functional boxes corresponding to those in FIG. 1 are used in a feed-back rather than a feedforward system. The embodiment of FIG. 2 will not be further described in this specification but will be easily derivable by one skilled in the art.

Figure 3:
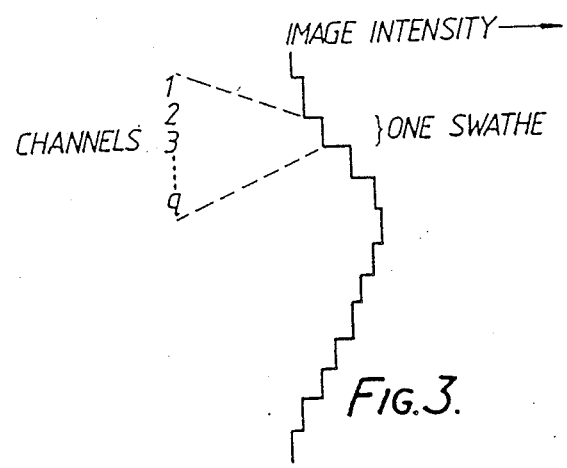
FIG. 3 shows schematically how the artifact image exhibits its effects.

The sequential input from all the detector channels is firstly acted upon by the measurement function 1. This is designed to produce a minimum set of image parameters which are to be used by the processing function to determine the exact form of the artifact image. Generally, the artifact image will be substantially constant in the horizontal image direction, i.e. the swathe direction, and hence it is found that a suitable parameter is the mean intensity of each image line. Typically this may be achieved in a digital system by accumulating the pixel intensity values along each line. If the number of pixel values is chosen to be for example a power of 2 then the output of the accumulator, suitably shifted, will provide an output representing the mean line intensity. An example of the result of the measurement function is shown in FIG. 3 which Figure is schematic since the average intensity of each line within a swathe is unlikely to be the same. However, the resulting pattern is likely to be repeated from swathe to swathe. Since the image is averaged in the horizontal direction much of the original image structure is suppressed, leaving the artifact image unaffected. Hence, the resulting signals generated by the measurement function comprise the low frequency vertical component of the original image, i.e. without the low amplitude high frequency components expressing the fine detail, together with the artifact components. However, large amplitude high frequency image components may still be present in the measured signal and will still be apparent in the output of unit 1.

The measured set of data line values are subsequently processed by processing unit 2 to calculate a set of corrections for each image. This is basically achieved by extracting the artifact image structure from the set of line averages and generating a signal which is in effect an inverse of the artifact error, thus serving to cancel out the effects of the artifact image.

Swathe related artifacts can generally take one of two forms, either as a constant structure down the image, i.e. appearing like a repeated structure on a diagram similar to FIG. 3, or one which changes in magnitude and/or sense down the displayed image.

In the following description the image is defined as comprising r swathes, each swathe comprising q lines produced by q detector channels. Hence the total number of image lines, n, is given by:

$$n = r.q$$

An image line may be referred to either by its line number L, where $1 \leq L \leq n$, or by its swathe number j where $1 \leq j \leq r$ and its channel number i where $1 \leq i \leq q$. These parameters are related by $$L = i + (j-1).q$$

The set of line averages produced by the measurement function 1 may be represented as the set of $x_L$ or $x_{ij}$ The first process that is applied is intended to remove low frequency image structure from the set of line averages $x_L$, thus producing a set of error estimates $e_L$ for each line. These will closely approximate to the artifact component in the image although perhaps may include some high frequency image component detail. Any suitable method may be used to achieve this although one method is to calculate the difference between each measured $x_L$ and a local average value for the $x_L$. Reference to FIG. 3 will show that an effective local average can be obtained by averaging q adjacent $x_L$ values, i.e. $e_L = x_L - Y_L$ Where $Y_L = \dfrac{1}{q} \sum\limits_{s=L-\frac{q}{2}}^{L+\frac{q}{2}} x_s$ For the case when there is no variation from swathe to swathe in the structure a first algorithm according to the present invention averages all the derived errors $e_L$ (or $e_{ij}$) for each channel so that the correction for channel i of any swathe is defined by $$\epsilon_i = \dfrac{1}{r} \sum_{j=1}^{r} e_{ij}$$

i.e. the algorithm calculates q corrections for each image, one correction for each channel.

This first simple algorithm is effective for most images in which there are no variations in the vertical direction from swathe to swathe.

For the case where the banding structure does vary from swathe to swathe a second algorithm is used. This calculates a correction for each image line that is the inverse of the error estimate of that line.

However, it will be appreciated that these error estimates can not be used unmodified with some images since some of the values derived will have resulted from particular image structure rather than artifact detail. These anomalous values must be removed to prevent introducing additional artifacts. A common situation where this applies is shown in FIGS. 4a to 4c where FIG. 4a shows a typical swathe related banding effect seen with an image with an object of noticeably different intensity to the background and having sudden changes in the vertical direction. FIG. 4b shows the same image after smoothing and FIG. 4c shows the effect of applying the algorithm described above to obtain error values $e_{ij}$ (difference between FIGs. 4a and 4b). It is seen that at the boundaries B of the object the error values derived are large and hence the use of the unmodified error values would tend to introduce additional artifacts into the image, thus degrading it. Accordingly this second algorithm includes a filtering function which filters the error values $e_L$ on a channel by channel basis. i.e. in which the calculated correction values for lines corresponding to a particular channel depend on the error estimates for that channel only.

Figure 5:
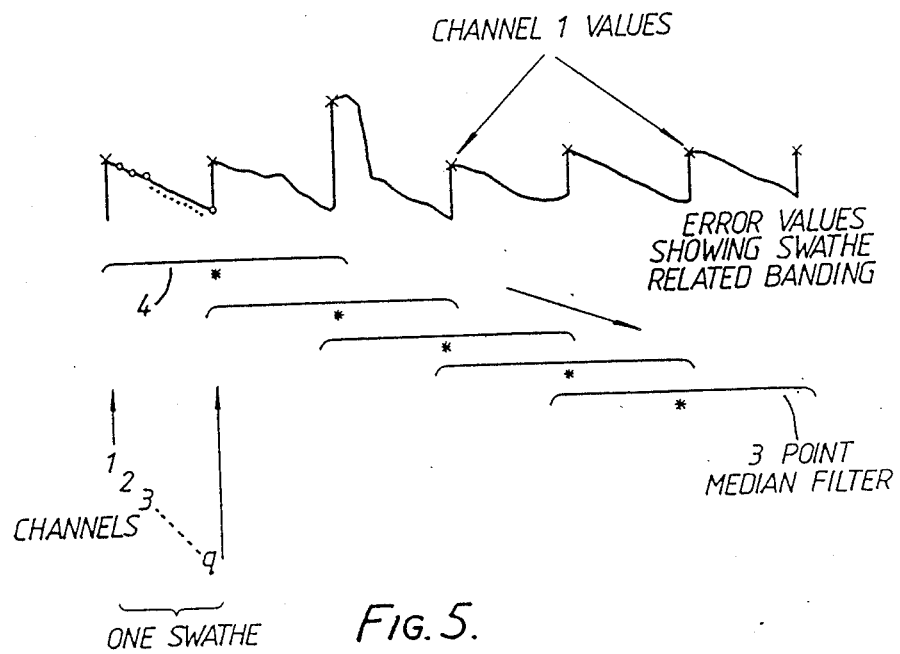
FIG. 5 shows how the application of a filter can increase the performance of the system.

FIG. 5 shows one example where a three point median filter 4 is used. An 'n' point median filter as used in the embodiment is a filter which replaces each input value with the median of n local input values; so, in the present case; each value is replaced by the median of that value and the immediately adjacent values for that channel, as is shown in FIG. 5. By using such a filter, additional artifact related detail such as that shown in the larger error value of channel one in the third swathe of the Figure is removed. Hence, any anomalous errors caused by the inclusion of high frequency image structure that stand out against the generally smoothly changing swathe errors are removed by the median filtering process.

The derived correction values are subsequently applied to the correction function unit 3. This then applies the correction values to each respective line of the image to cancel the artifact image.

Figure 6:
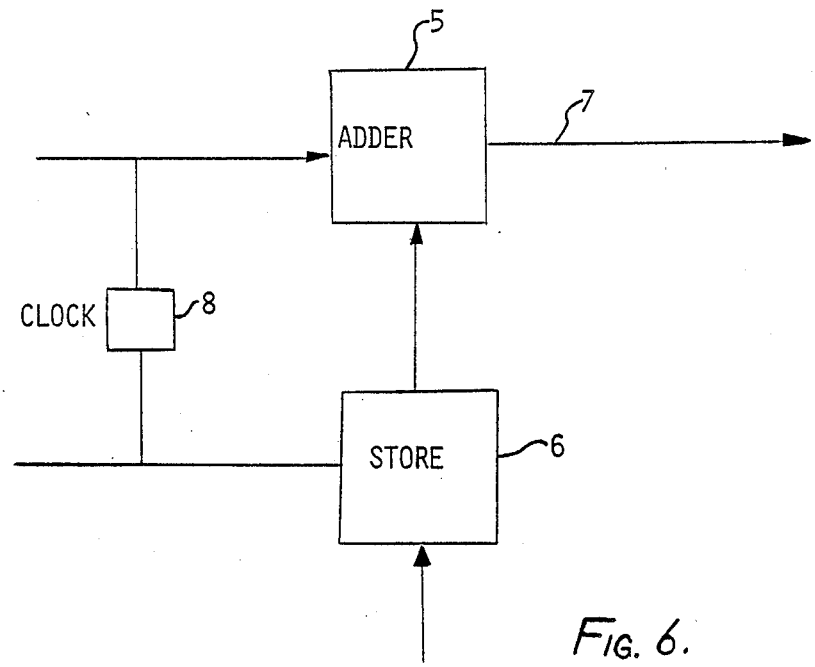
FIG. 6 is a block circuit diagram which shows a schematic digital correction circuit.

The calculated correction values may be applied by either analogue or digital means by methods well known in the art. An analogue correction method may introduce a proportional dc offset in the image signal for each respective line. A digital processing method may require the corrections to be added to each sample or pixel on each line. A schematic digital system is shown in FIG. 6 in which the uncorrected digital image data is applied to a digital adder 5. The correction values for each line are held in a store 6 and added, pixel by pixel, to the uncorrected data in the adder, dependent upon the line and/or channel to which the data pertain, such that corrected data is output on line 7. A clock 8 is used to synchronise the system and the correction values are fed into store 6 during an initial scan. These values can be updated as required. In use, one correction value for the first line may be added to each pixel of that line in turn, a second value to each pixel of the second line and so on.

We claim:

1. Apparatus for processing an image, which image is of the type comprising a plurality of lines which together form a representation of the image, comprising, means for deriving a first set of values, each value being representative of a predetermined parameter of each image line; set of values, each respective second value being substantiallY representative of an artifact image for each respective line; means for deriving from the second set of values a set of correction values for applying to the image; and means for applying the correction values to the image.

2. Apparatus as claimed in claim 1, wherein the predetermined parameter is the average intensity of each respective line.

3. Apparatus as claimed in claim 2, wherein the means for deriving the average intensity of each respective line comprises an accumulator to which the intensity values of each pixel within the line are applied.

4. Apparatus as claimed in claim 1, wherein each respective one of the second set of values is the difference between each respective one of the first set of values and a local average value of the predetermined parameter over a predetermined number of adjacent lines.

5. Apparatus as claimed in claim 4, adapted for use with an image whose artifact has a substantially regular repeated structure, including means for calculating the local average over a number of values equal to the repetition period of the regular structure.

6. Apparatus as claimed in claim 5, wherein the single correction value for each channel is derived from the mean or median of the related values of the second set of values for that channel.

7. Apparatus as claimed in claim 1, wherein the means for deriving the set of correction values comprises means for filtering the second set of values to obtain a unique correction value for each individual line.

8. Apparatus as claimed in claim 7, adapted for use with a swathe scanned image, wherein the filtering means is arranged to perform a filtering function on the second set of values for each channel individually.

9. Apparatus as claimed in claim 7, wherein the filtering means is a three point median filter.

10. Apparatus as claimed in claim 1, configured as a feed-forward arrangement

11. Apparatus as claimed in claim 1, configured as a feed-back arrangement.

* * * * *